United States Patent
Song

(10) Patent No.: US 10,250,774 B2
(45) Date of Patent: Apr. 2, 2019

(54) CONTENT TRANSMITTING METHOD AND APPARATUS THEREFOR

(71) Applicant: HP PRINTING KOREA CO., LTD., Suwon-si, Gyeonggi-do (KR)

(72) Inventor: Hyung-seon Song, Suwon-si (KR)

(73) Assignee: HP Printing Korea Co., Ltd., Suwon-si (KR)

( * ) Notice: Subject to any disclaimer, the term of this patent is extended or adjusted under 35 U.S.C. 154(b) by 0 days.

(21) Appl. No.: 15/625,240

(22) Filed: Jun. 16, 2017

(65) Prior Publication Data
US 2017/0374230 A1    Dec. 28, 2017

(30) Foreign Application Priority Data

Jun. 22, 2016  (KR) .......... 10-2016-0078109
Aug. 19, 2016  (KR) .......... 10-2016-0105597

(51) Int. Cl.
| H04N 1/32 | (2006.01) |
| H04N 1/00 | (2006.01) |
| H04M 1/2745 | (2006.01) |
| H04M 1/725 | (2006.01) |

(52) U.S. Cl.
CPC ..... *H04N 1/32117* (2013.01); *H04N 1/00307* (2013.01); *H04N 1/00352* (2013.01); *H04N 1/00408* (2013.01); *H04M 1/274516* (2013.01); *H04M 1/7253* (2013.01); *H04M 2250/04* (2013.01); *H04N 2201/3269* (2013.01)

(58) Field of Classification Search
CPC .................................................. H04N 1/32117
USPC ................................................... 358/1.15
See application file for complete search history.

(56) References Cited

U.S. PATENT DOCUMENTS

| 7,532,716 B2 | 5/2009 | Otsuka | |
| 2006/0218247 A1 | 9/2006 | Sauve et al. | |
| 2007/0019215 A1* | 1/2007 | Yu | H04N 1/00307 358/1.3 |
| 2007/0019232 A1* | 1/2007 | Kano | H04N 1/00307 358/1.15 |
| 2007/0076229 A1 | 4/2007 | Kim | |
| 2012/0124059 A1 | 5/2012 | Pratt et al. | |

(Continued)

FOREIGN PATENT DOCUMENTS

| JP | 2003-319093 A | 11/2003 |
| JP | 2015-231176 A | 12/2015 |
| KR | 10-2015-0096274 A | 8/2015 |

*Primary Examiner* — Jacky X Zheng
(74) *Attorney, Agent, or Firm* — Jefferson IP Law, LLP

(57) ABSTRACT

A method for transmitting content and an apparatus therefor are provided. The apparatus includes a transceiver configured to transmit content to an external source, a display configured to display receiver information about the content, and a user interface (UI) element, a memory configured to store identification information of the electronic apparatus, and at least one processor configured to generate a code comprising the identification information, based on a user input of selecting the UI element, receive the receiver information from an external device, and control the display to display the receiver information on the display. The electronic apparatus can use address information stored in the external device, without a separate communication setting with the external device that provides the receiver information.

20 Claims, 21 Drawing Sheets

(56) References Cited

U.S. PATENT DOCUMENTS

| | | | |
|---|---|---|---|
| 2012/0199647 A1* | 8/2012 | Hwang | G06Q 10/087 235/375 |
| 2012/0209686 A1* | 8/2012 | Horowitz | H04W 4/21 705/14.26 |
| 2013/0134213 A1 | 5/2013 | Pallakoff et al. | |
| 2014/0092411 A1 | 4/2014 | Burke, Jr. | |
| 2014/0110468 A1* | 4/2014 | Kandregula | G06Q 30/0241 235/375 |
| 2014/0376035 A1* | 12/2014 | Niimura | G06F 3/1203 358/1.15 |
| 2015/0060547 A1* | 3/2015 | Nagasawa | G06F 3/1236 235/454 |
| 2015/0092233 A1* | 4/2015 | Park | G06F 3/1288 358/1.15 |
| 2015/0302421 A1 | 10/2015 | Caton et al. | |
| 2016/0182762 A1* | 6/2016 | Eum | H04N 1/4413 358/1.14 |
| 2016/0295037 A1* | 10/2016 | Kawai | H04N 1/00204 |
| 2017/0126926 A1* | 5/2017 | Saito | H04N 1/00307 |
| 2017/0171414 A1* | 6/2017 | Naito | H04N 1/00973 |

* cited by examiner

```
<?xml version="1.0" encoding="UTF-8"?>
<MFPInformation>
        <application> —— 501
                <name> </name> —— 503
                <supportedJobType> </supportedJobType> —— 505
                <requestJobType> </requestJobType> —— 507
                <isMultiJob> </isMultiJob> —— 509
                <url> </url>
        </application>
        <device> —— 511
                <IPAddress> </IPAddress> —— 513
                <macAddress> </macAddress> —— 515
                <hostName> </hostName> —— 517
                <location> </location> —— 519
                <serialNumber> </serialNumber> —— 521
                <modelName> </modelName> —— 523
        </device>
</MFPInformation>
```

```
POST http://10.220.202.251/SendApp/remoteAddressbook.sws HTTP/1.1
Accept-Encoding: gzip, deflate
Content-Type: application/x-www-form-urlencoded
Content-Length: 43
Host: 10.220.202.251  ── 601
Proxy-Connection: Keep-Alive
User-Agent: Apache-HttpClient/4.1.1 (java 1.5)

Email=EMAIL ADDRESS&Fax=FAX NUMBER&SCP=PHONE NUMBER
          |                  |               |
         603                605             607
```

FIG. 8

```
<?xml version="1.0" encoding="UTF-8"?>
<MFPInformation>
        <application> — 802     801    803 805   807
                <name> SendApp </name>
                <supportedJobType> Email ; SCP ; Fax </supportedJobType>
                <requestJobType> Email </requestJobType>
                <isMultiJob> false </isMultiJob>  809
                <url> SendApp/remoteAddressbook.sws </url>
        </application>
                              811    813
        <device> — 812
                <IPAddress> 10.220.202.251 </IPAddress>
                <macAddress> 30:cd:a7:5e:e8:ad </macAddress>
                <hostName> SEC30CDA75EE8AD </hostName>
                <location> Printing 2F </location>   815
                <serialNumber> 28TVB1BF600006L </serialNumber>
                <modelName> X4250LX </modelName>
        </device>
</MFPInformation>         816    819    817
```

```
                            901        902                          900
                             |          |
POST http://10.220.202.251/SendApp/remoteAddressbook.sws HTTP/1.1
Accept-Encoding: gzip, deflate
Content-Type: application/x-www-form-urlencoded
Content-Length: 43
Host: 10.220.202.251 —— 903
Proxy-Connection: Keep-Alive
User-Agent: Apache-HttpClient/4.1.1 (java 1.5)

Email=abc%40samsung.com%3B123%40samsung.com
  |
 905
```

```
<?xml version="1.0" encoding="UTF-8"?>
<MFPInformation>
        <application>              1109
                <name> SendApp </name>
                <supportedJobType> Email ; SCP ; Fax </supportedJobType>
                <requestJobType> SCP </requestJobType>
                <isMultiJob> false </isMultiJob>
                <url> SendApp/remoteAddressbook.sws </url>
        </application>
        <device>
                <IPAddress> 10.220.202.251 </IPAddress>
                <macAddress> 30:cd:a7:5e:e8:ad </macAddress>
                <hostName> SEC30CDA75EE8AD </hostName>
                <location> Printing 2F </location>
                <serialNumber> 28TVB1BF600006L </serialNumber>
                <modelName> X4250LX </modelName>
        </device>
</MFPInformation>
```

FIG. 12

```
                 1201      1202                                  1200
                   |         |
POST http://10.220.202.251/SendApp/remoteAddressbook.sws HTTP/1.1
Accept-Encoding: gzip, deflate
Content-Type: application/x-www-form-urlencoded
Content-Length: 43
Host: 10.220.202.251 —— 1203
Proxy-Connection: Keep-Alive
User-Agent: Apache-HttpClient/4.1.1 (java 1.5)

SCP=01012345678%3B01087654321
  |
 1205
```

FIG. 14

```
<?xml version="1.0" encoding="UTF-8"?>
<MFPInformation>
        <application>
                <name> SendApp </name>
                <supportedJobType> Email ; SCP ; Fax </supportedJobType>
                <requestJobType> Fax </requestJobType>
                <isMultiJob> false </isMultiJob>
                <url> SendApp/remoteAddressbook.sws </url>
        </application>
        <device>
                <IPAddress> 10.220.202.251 </IPAddress>
                <macAddress> 30:cd:a7:5e:e8:ad </macAddress>
                <hostName> SEC30CDA75EE8AD </hostName>
                <location> Printing 2F </location>
                <serialNumber> 28TVB1BF600006L </serialNumber>
                <modelName> X4250LX </modelName>
        </device>
</MFPInformation>
```

```
<?xml version="1.0" encoding="UTF-8"?>
<MFPInformation>
       <application>
              <name> SendApp </name>
              <supportedJobType> Email ; SCP ; Fax </supportedJobType>
              <requestJobType> </requestJobType>
              <isMultiJob> true </isMultiJob>
1609          <url> SendApp/remoteAddressbook.sws </url>
       </application>
       <device>
              <IPAddress> 10.220.202.251 </IPAddress>
              <macAddress> 30:cd:a7:5e:e8:ad </macAddress>
              <hostName> SEC30CDA75EE8AD </hostName>
              <location> Printing 2F </location>
              <serialNumber> 28TVB1BF600006L </serialNumber>
              <modelName> X4250LX </modelName>
       </device>
</MFPInformation>
```

CONTENT TRANSMITTING METHOD AND APPARATUS THEREFOR

CROSS-REFERENCE TO RELATED APPLICATION(S)

This application claims the benefit under 35 U.S.C. § 119(a) of a Korean patent application filed on Jun. 22, 2016 in the Korean Intellectual Property Office and assigned Serial number 10-2016-0078109, and claims the benefit under 35 U.S.C. § 119(a) of a Korean patent application filed on August 19, 2016 in the Korean Intellectual Property Office and assigned Serial number 10-2016-0105597, the entire disclosure of each of which is hereby incorporated by reference.

TECHNICAL FIELD

The present disclosure relates to a content transmitting method performed by an electronic apparatus, and a device therefor.

BACKGROUND

Due to developments in communication technologies, a technique of transmitting content to a user-designated receiver is being studied, the content being generated by scanning by an electronic apparatus or being stored in the electronic apparatus. In order for the electronic apparatus to transmit the content to the user-designated receiver, a user has to input receiver information. However, most electronic apparatuses do not have a separate input device for inputting various letters, and thus, the user inputs the receiver information by using limited buttons or a touchscreen, thereby being inconvenienced.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides various embodiments of an electronic apparatus for inputting receiver information about content by using a mobile device. In particular, a method of easily inputting, by the electronic apparatus, receiver information by using an address book stored in the mobile device is provided. The present disclosure also provides a non-transitory computer-readable recording medium having recorded thereon a program for executing the method, by using a computer. Technical aspects of the present disclosure are not limited to what are described above, and additional aspects will be set forth in part in the description which follows and, in part, will be apparent from the description, or may be learned by practice of the presented embodiments.

In accordance with an aspect of the present disclosure, an electronic apparatus is provided. The electronic apparatus includes a transceiver configured to transmit content to an external source, a display configured to display receiver information about the content and a user interface (UI) element, a memory configured to store identification information of the electronic apparatus, and at least one processor configured to generate a code including the identification information, based on a user input of selecting the UI element, receive the receiver information from a mobile device, and control the display to display the receiver information on the display.

The at least one processor may be further configured to generate the code, based on a user input of selecting a category of the receiver information. The code may include data for filtering one or more addresses stored in the mobile device. The at least one processor may be further configured to generate the code as an image and to control the display to display the image on the display. The code may include a quick response (QR) code. The code may include near-field communication (NFC) tag information.

The at least one processor may be further configured to control the display to display the UI element on a periphery of the receiver information displayed on the display. The identification information of the electronic apparatus may include an internet protocol (IP) address or a media access control (MAC) address.

The electronic apparatus may further include a scanner, and wherein the content is generated by using the scanner.

In accordance with an aspect of the present disclosure, a mobile device is provided. The mobile device includes a camera, a transceiver configured to communicate with an electronic apparatus, a memory configured to store an address book, a display configured to display the address book on a screen, and a controller configured to capture an image displayed on a display of the electronic apparatus by using the camera, input the image to the mobile device, extract identification information of the electronic apparatus and first data from the image, filter the address book stored in the mobile device by using the first data, display the filtered address book on the screen, generate a data file including at least one address selected based on a user input of selecting the at least one address from the address book displayed on the screen, and transmit the data file to the electronic apparatus, based on the identification information.

In accordance with an aspect of the present disclosure, a mobile device is provided. The mobile device includes a NFC module, a transceiver configured to communicate with an electronic apparatus, a memory configured to store an address book, a display configured to display the address book on a screen, and at least one processor configured to receive NFC tag information from the electronic apparatus by using the NFC module, extract identification information of the electronic apparatus and first data from the NFC tag information, filter the address book stored in the mobile device by using the first data, display the filtered address book on the screen, generate a data file including at least one address selected based on a user input of selecting the at least one address from the address book displayed on the screen, and transmit the data file to the electronic apparatus, based on the identification information.

In accordance with an aspect of the present disclosure, a method of transmitting content by an electronic device is provided. The method includes receiving a user input for selecting a UI element displayed on a screen, generating a code including identification information of the electronic apparatus, based on the user input, transmitting the code to an external device, receiving receiver information transmitted from an external device that received the code, displaying the receiver information on a first area of the screen, and transmitting the content to an external source, based on the receiver information.

The UI element may be displayed on a periphery of the first area of the screen.

The method may further include receiving a user input for selecting a category of the receiver information, and generating the code based on the user input. The code may include data for filtering one or more addresses stored in the mobile device.

The method may further include generating the code as an image, and displaying the image on the screen. The code may include a QR code. The code may include NFC tag information. The identification information of the electronic apparatus may include an IP address or a MAC address.

In accordance with an aspect of the present disclosure, a method for sharing an address between the mobile device and an electronic apparatus is provided. The method includes capturing, by using a camera of the mobile device, an image displayed on a screen of the electronic apparatus, and inputting the image to the mobile device, reading identification information of the electronic apparatus and first data from the image, filtering an address book stored in the mobile device by using the first data, and displaying the filtered address book on the screen, receiving a user input of selecting at least one address from the address book displayed on the screen, generating a data file including the selected at least one address, and transmitting the data file to the electronic apparatus, based on the identification information of the electronic apparatus.

In accordance with an aspect of the present disclosure, a non-transitory computer-readable recording medium has recorded thereon instructions for executing a method for sharing an address between a mobile device and an electronic apparatus, and the method is provided. The method includes capturing, by using a camera of the mobile device, an image displayed on a screen of the electronic apparatus, and inputting the image to the mobile device, reading identification information of the electronic apparatus and first data from the image, filtering an address book stored in the mobile device by using the first data, and displaying the filtered address book on the screen, receiving a user input of selecting at least one address from the address book displayed on the screen, generating a data file including the selected at least one address, and transmitting the data file to the electronic apparatus, based on the identification information of the electronic apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which:

FIG. 5 illustrates an example of a quick response (QR) code data format generated by the image forming apparatus, according to an embodiment of the present disclosure;

FIG. 6 illustrates an example of a data file to be transmitted from a mobile device to the image forming apparatus, according to an embodiment of the present disclosure;

FIGS. 7, 8, and 9 illustrate a code generated by the image forming apparatus, a screen displayed on a mobile device, and a data file transmitted from the mobile device, when a user selects a receiver category to be an email address according to various embodiments of the present disclosure;

FIGS. 10, 11, and 12 illustrate a code generated by the image forming apparatus, a screen displayed on the mobile device, and a data file transmitted from the mobile device, when a user selects a receiver category to be a secure copy (SCP) according to various embodiments of the present disclosure;

FIGS. 13 and 14 illustrate a code generated by the image forming apparatus and a screen displayed on the mobile device, when a user selects a receiver category to be a fax according to various embodiments of the present disclosure;

FIGS. 15, 16, and 17 illustrate a code generated by the image forming apparatus, a screen displayed on the mobile device, and a data file transmitted from the mobile device, when a user selects a receiver category to be Multi according to various embodiments of the present disclosure;

DETAILED DESCRIPTION

Figure 1:
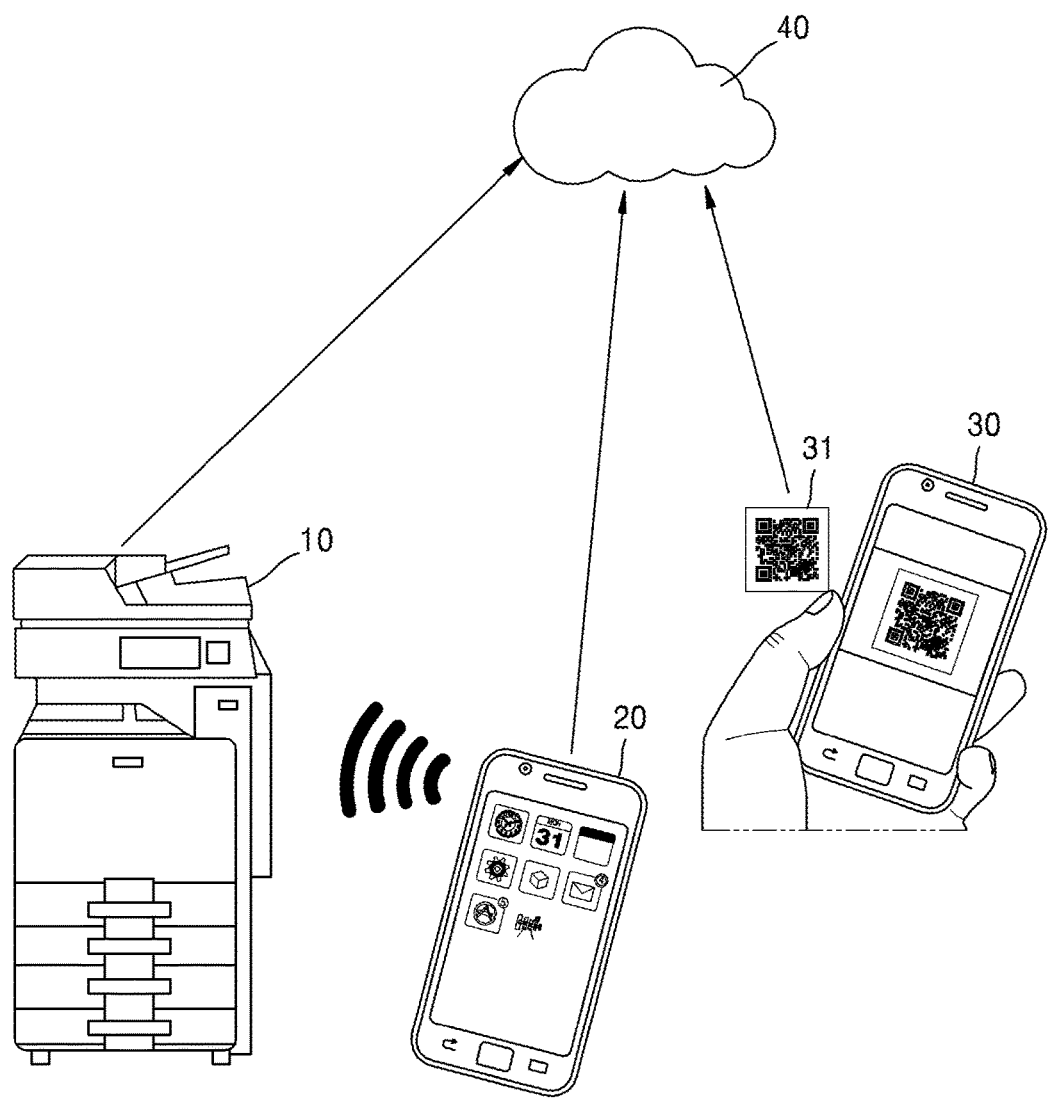
FIG. 1 illustrates a configuration of communication between an electronic apparatus and mobile devices, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, like reference numerals denote like elements. Not all elements of the embodiments are described in the specification, and thus general features in the art or redundant features among the embodiments may be omitted.

Throughout the specification, the term 'part' or 'module' may be embodied as software and/or hardware, and a plurality of parts may be embodied in one unit or element, or one part may include a plurality of elements.

When a certain configuration is referred to as being "on", "connected to" or "coupled with" another configuration, it can be directly on the other configuration, or another intervening configuration may also be present.

Throughout the specification, an image forming job may refer to various image-associated jobs (e.g., printing, scanning, or fax) such as forming an image, or generating, storing, or transmitting an image file, and the term 'job' may refer to not only the image forming job but may also refer to a series of processes required to perform the image forming job.

In addition, an "image forming apparatus" may refer to all apparatuses such as a printer, a scanner, a fax machine, a multi-function printer (MFP), or the like that are capable of performing an image forming job. In addition, "content" may refer to all types of data such as a picture, an image, a document file, or the like that is a target object of the image forming job. In addition, "print data" may refer to data that is converted to a format printable in a printer. In addition, a "scanned file" may refer to a file generated by scanning an image, the scanning being performed by a scanner. In addition, a "user" may indicate a person who performs manipulation associated with the image forming job by using the image forming apparatus or a device connected to the image forming apparatus in a wired or wireless manner In addition, the "user" may indicate an apparatus (e.g., an artificial intelligence electronic apparatus, a robot, etc.) that performs the manipulation associated with the image forming job.

Throughout the specification, a "user interface (UI) element" may refer to a graphic object displayed on a screen so as to receive an input from a user or to provide information to the user.

Reference will now be made in detail to embodiments, examples of which are illustrated in the accompanying drawings.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a configuration of communication between an electronic apparatus 10 and mobile devices 20 and 30, according to an embodiment of the present disclosure.

Referring to FIG. 1, the electronic apparatus 10 and the mobile devices 20 and 30 are illustrated. The electronic apparatus 10 may include a communicator (e.g., a transceiver) and may be connected to an internet network 40 in a wired or wireless manner For example, the electronic apparatus 10 may be at least one of an image forming apparatus, a refrigerator, a washing machine, a microwave oven, a television (TV) or a personal computer (PC). Throughout the specification, for convenience of description, it is assumed that the electronic apparatus 10 corresponds to the image forming apparatus, but the present disclosure is not limited thereto, and may correspond to similar devices. In addition, throughout the specification, for convenience of description, it is assumed that the mobile devices 20 and 30 correspond to devices adjacent to the electronic apparatus 10, but the present disclosure is not limited thereto, and may correspond to similar devices.

When the electronic apparatus 10 transmits content stored in a memory to an external source of the electronic apparatus 10, the electronic apparatus 10 may transmit the content to a user-designated receiver via the internet network 40. When the user inputs, to the electronic apparatus 10, receiver information about a receiver that is to receive the content, the content may be transmitted to the desired receiver via the internet network 40. The content may be stored in the memory of the electronic apparatus 10. The content may be a scanned file or a file received via the fax.

The receiver information may include an email address and/or a phone number. When the user inputs the email address, the content may be transmitted to a receiver of the email address via the internet network 40. When the user inputs the phone number, the content may be transmitted to a receiver of the fax corresponding to the phone number or a cloud server. In another embodiment, the receiver information may include a mailing address. When the mailing address is input as the receiver information, the content may be transmitted to a print server so as to be printed and then may be delivered to a receiver of the mailing address.

The user may input the receiver information through an input unit or device included in the electronic apparatus 10. In addition, the user may transmit an address stored in the mobile device 20 or 30 to the electronic apparatus 10 via the mobile device 20 or 30. The electronic apparatus 10 may receive address information pre-stored in the mobile device 20 or 30 and may use the address information as the receiver information. When the user requests an address from the electronic apparatus 10 to the mobile device 20 or 30, the address stored in the mobile device 20 or 30 may be input to the electronic apparatus 10. The electronic apparatus 10 may transmit the content to the address received from the mobile device 20 or 30. For example, when an email address is received from the mobile device 20 or 30, the electronic apparatus 10 may transmit the content to the email address. When a phone number is received from the mobile device 20 or 30, the electronic apparatus 10 may transmit the content to a printing server or a receiver of a fax corresponding to the phone number.

In order to receive an address from the mobile device 20 or 30, the electronic apparatus 10 may transmit identification information of the electronic apparatus 10 and application information about a currently-executed application to the mobile device 20 or 30. The identification information refers to information for identifying an electronic apparatus in the internet network 40 and may include an internet protocol (IP) address and a media access control (MAC) address.

The mobile device 20 or 30 may transmit the address to the electronic apparatus 10 by using the identification information via the internet network 40. In addition, the mobile device 20 or 30 may transmit, by using the application information, the address to the application that is being executed in the electronic apparatus 10.

In order for the electronic apparatus 10 to transmit the identification information and the application information about a currently-executed application to the mobile device 20 or 30, a communication channel has to be established between the electronic apparatus 10 and the mobile device 20 or 30. However, it is a difficult job for an ordinary person to set communication between two devices, the electronic apparatus 10 according to the present embodiment may transmit the identification information of the electronic apparatus 10 and the application information about a currently-executed application by using a communication unit (e.g., a transceiver) that does not require separate setting. For example, the electronic apparatus 10 may transmit the identification information and the application information about a currently-executed application to the mobile device 20 through near-field communication (NFC) tagging. In addition, the electronic apparatus 10 may generate a quick response (QR) code 31, and the mobile device 30 may recognize the QR code 31 by using an embedded camera and may extract the identification information of the electronic apparatus 10 and the application information about a currently-executed application which are included in the QR code 31. The mobile device 20 or 30 may transmit the address to the electronic apparatus 10 via the internet network 40 by using the identification information of the electronic apparatus 10 and the application information about a currently-executed application which are included in NFC tag information or the QR code 31. The mobile device 20 or 30 may access the internet network 40 via wired or wireless communication and may transmit the address to the electronic apparatus 10. In more detail, the mobile device 20 or 30 may transmit the address to the electronic apparatus 10 according to the Hypertext Transfer Protocol (HTTP) protocol.

Figure 2A:
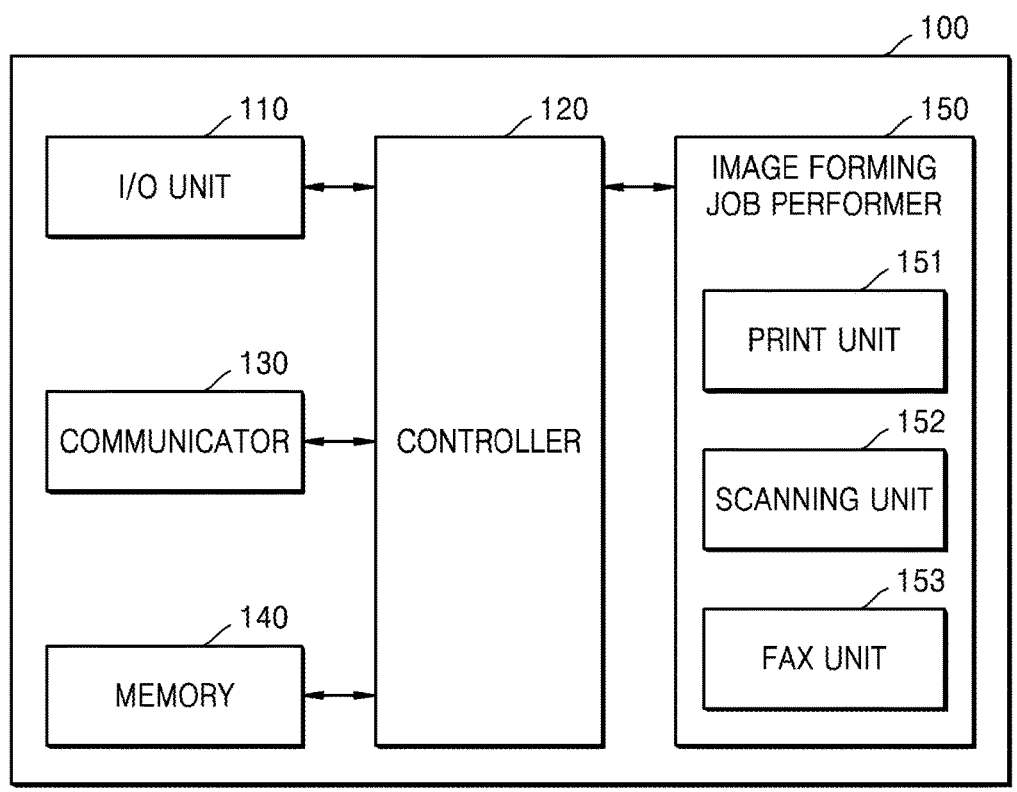
FIG. 2A illustrates a configuration of an image forming apparatus, according to an embodiment of the present disclosure.

FIG. 2A illustrates a configuration of an image forming apparatus 100 (e.g., the electronic apparatus 10 of FIG. 1) according to an embodiment of the present disclosure.

Referring to FIG. 2A, the image forming apparatus 100 according to the present embodiment may include an input and output (I/O) unit 110 (e.g., an I/O device), a controller 120 (e.g., at least one processor), a communicator 130 (e.g., a transceiver), a memory 140, and an image forming job performer 150.

The I/O unit 110 may include an input unit for receiving an input of performing an image forming job from a user, and an output unit for displaying a result of the performing the image forming job or information such as a state of the image forming apparatus 100. In more detail, the input unit may include a keyboard, physical buttons, a touchscreen, or the like. The output unit may include a display panel, or the like.

The controller 120 may control all operations of the image forming apparatus 100, and may include a processor or at least one processor such as a central processing unit (CPU). The controller 120 may control other configurations included in the image forming apparatus 100 to perform an operation corresponding to a user input received through the I/O unit 110.

In addition, the controller 120 may execute a program stored in the memory 140, may read a file stored in the memory 140, or may store a new file in the memory 140.

The communicator 130 may perform wired or wireless communication with another device or a network. To do so, the communicator 130 may include at least one of a short-distance communication module, a wired communication module, and a wireless communication module.

The communicator 130 may be connected to an external device (not shown), e.g., a mobile device, in the outside of the image forming apparatus 100, so that the communicator 130 may transmit a signal or data received from the external device to the controller 120 or may transmit a signal or data generated by the controller 120 to the external device. For example, when the communicator 130 receives a print command signal and content from the external device, the controller 120 may convert the received content to print data and may output the print data through a print unit 151. In this case, the external device may be at least one of a smartphone, a PC, a server, an electronic device, medical equipment, a camera, and a wearable device.

The memory 140 may store various types of data such as a program, a file, or the like. In addition, the memory 140 may include an external memory connected via an I/O port of the image forming apparatus 100.

The image forming job performer 150 may include the print unit 151, a scanning unit 152, and a fax unit 153, or may include only some of the print unit 151, the scanning unit 152, and the fax unit 153 according to requirement.

The print unit 151 may form an image on a recording medium by using one of various printing schemes including an electrophotographic scheme, an inkjet scheme, a thermal transfer scheme, a thermosensitive scheme, or the like. The scanning unit 152 may irradiate light to a document, and may receive reflected light, thereby reading an image recorded to the document. The fax unit 153 may share a configuration for scanning an image with the scanning unit 152, may share a configuration for printing a received file with the print unit 151, and may transmit a scanned file to a destination or may receive a file from an external source.

Figure 2B:
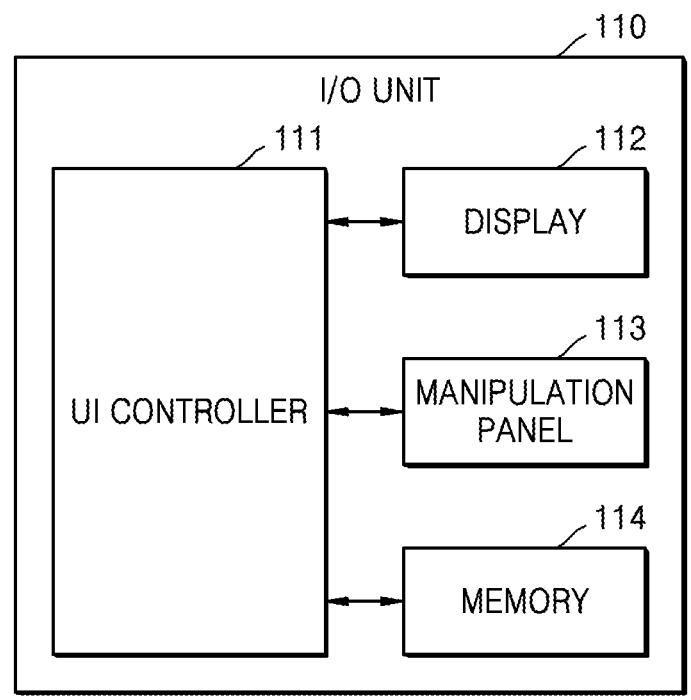
FIG. 2B illustrates a detailed configuration of an input/output (I/O) unit (or device) of the image forming apparatus, according to an embodiment of the present disclosure.

FIG. 2B illustrates a detailed configuration of the I/O unit 110 according to an embodiment of the present disclosure.

Referring to FIG. 2B, the I/O unit 110 may include a UI controller 111, a display 112, a manipulation panel 113, and a memory 114.

The I/O unit 110 may include an independent control system (the UI controller 111 and the memory 114) that is separate from the controller 120. The UI controller 111 is formed as a processor such as a CPU, like the controller 120, and may control a UI provided by the I/O unit 110.

The display 112 may include a liquid-crystal display (LCD) panel or an organic light-emitting diode (OLED) panel, and the manipulation panel 113 may include the physical buttons, the touchscreen, or the like.

Figure 3:
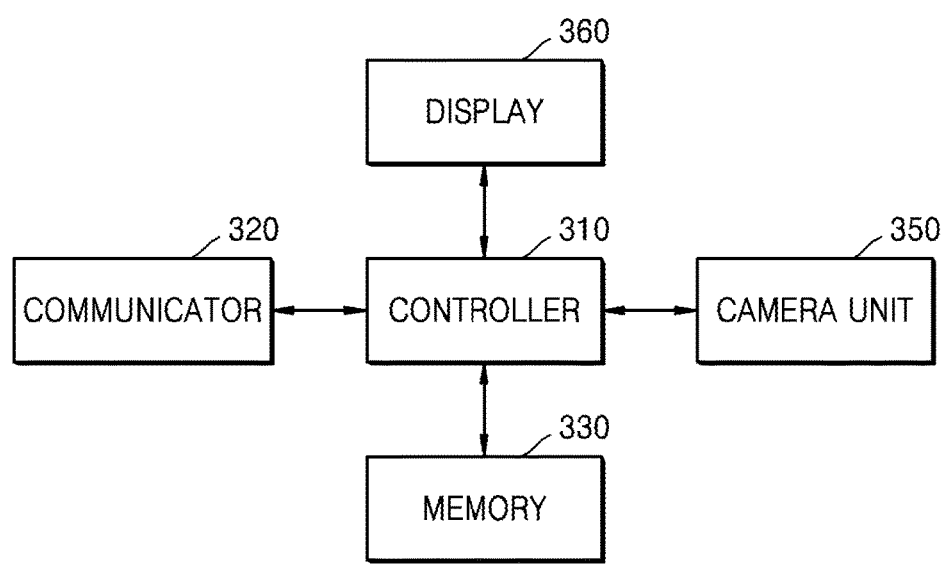
FIG. 3 is a block diagram of a mobile device according to an embodiment of the present disclosure.

FIG. 3 is a block diagram of a mobile device (e.g., the mobile device 30 in FIG. 1) according to an embodiment of the present disclosure.

Referring to FIG. 3, the mobile device may include a controller 310 (e.g., at least one processor), a communicator 320 (e.g., a transceiver), a memory 330, a camera unit 350 (e.g., a camera), and a display 360. For convenience of description, it is assumed that the mobile device may correspond to the mobile device 30.

The controller 310 performs a function that is equal or similar to that of the controller 120 described with reference to FIG. 2A.

The communicator 320 performs a function that is equal or similar to that of the communicator 130 described with reference to FIG. 2A. In addition, the communicator 320 may include an NFC module. The NFC module may read NFC tag information generated by the image forming apparatus 100. The NFC tag information may include the identification information of the image forming apparatus 100 and the application information about a currently-executed application.

The memory 330 performs a function that is equal or similar to that of the memory 140 described with reference to FIG. 2A. The memory 330 may store an address book.

The address book may include email addresses, mailing addresses, fax numbers, and/or phone numbers.

The display 360 may include an LCD, a light-emitting diode (LED) display, an OLED display, a microelectromechanical systems (MEMS) display, or an electronic paper display. The display 360 may display various types of content (e.g., a text, an image, a video, an icon, and/or a symbol) to a user. The display 360 may include a touchscreen, and may receive a touch input, a gesture input, a proximity input, or a hovering input using an electronic pen or a part of a body of the user.

The address book stored in the memory 330 may be displayed on a screen of the display 360. The user may select at least one address from the address book displayed on the screen of the display 360, thereby transmitting the address to the image forming apparatus 100.

The camera unit 350 may refer to a device capable of capturing a still image and a moving picture, and according to the present embodiment, the camera unit 350 may include at least one image sensor (e.g., a front image sensor or a rear image sensor), a lens, an image signal processor (ISP), a flash (e.g., LED light, a Xenon lamp, etc.), or the like.

The camera unit 350 may capture an image of a QR code or a barcode generated by the image forming apparatus 100, and may generate and transmit an image file to the controller 310, and the controller 310 may analyze the image file and then may extract the identification information of the image forming apparatus 100 and the application information about a currently-executed application which are included in the QR code or the barcode.

Figure 4:
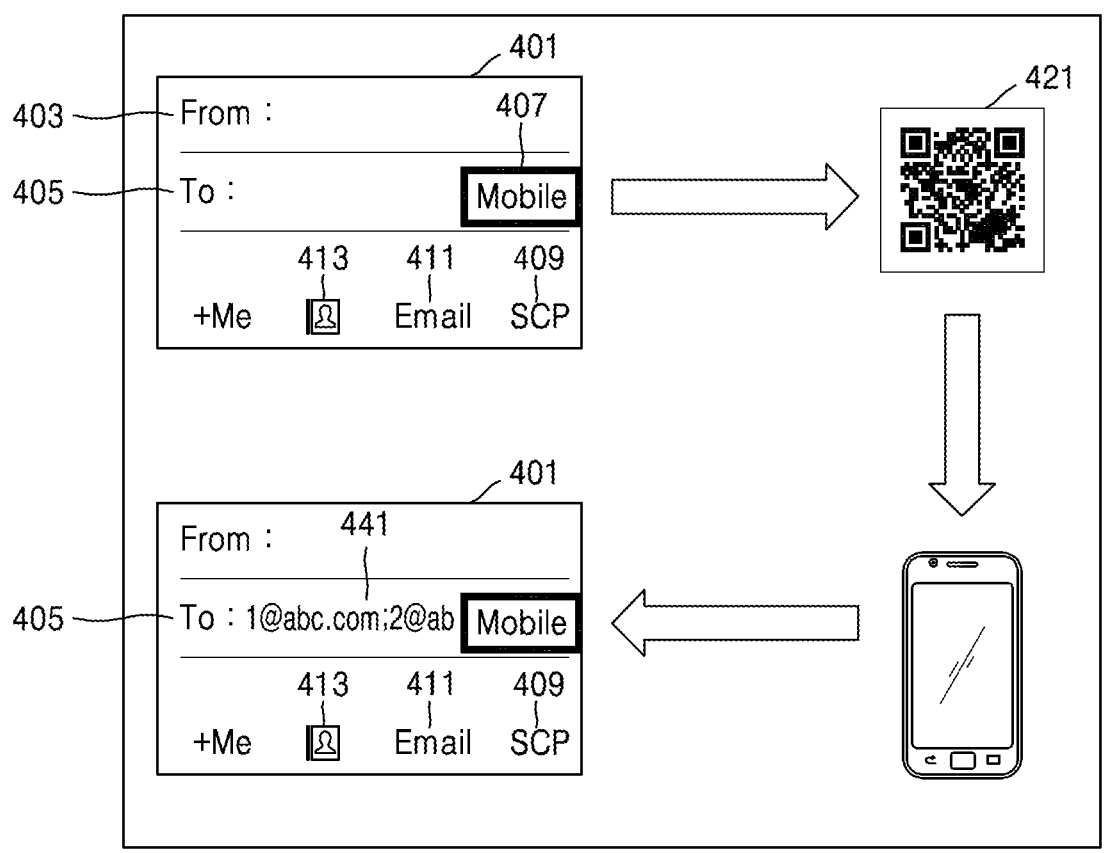
FIG. 4 illustrates a process of sharing an address of a mobile device between an image forming apparatus and a mobile device, according to an embodiment of the present disclosure.

FIG. 4 illustrates a process of sharing an address of a mobile device between the image forming apparatus 100 (e.g., the electronic device 10) and a mobile device (e.g., the mobile device 20 or 30 in FIG. 1), according to an embodiment of the present disclosure. The address may include an email address, a mailing address, a fax number, and a phone number.

FIG. 4 illustrates a screen of a currently-executed application on a display of the image forming apparatus 100. The application may be a program for transmitting content to an external source. For example, the application may transmit the content to an image forming apparatus of another user or a server. An address of a person to receive the content is displayed on a first area 405 of a screen 401, and an address of a person to send the content is displayed on a second area 403 of the screen 401. In addition, icons 409, 411, and 413 for selecting a type of a job are displayed on the screen 401. The type of a job may be information indicating a category of an address. For example, the category may include a phone number (e.g., icon 413), an email (e.g., icon 411), and a cloud print (e.g., icon 409). When a user selects one of categories displayed on the screen 401, one or more addresses included in the selected category may be displayed on the screen 401, and when the user selects at least one of the one or more addresses displayed on the screen 401, the selected address may be displayed on the first area 405 of the screen 401. The address may include an email address, a mailing address, a fax number, and/or a phone number.

For example, when the user selects the icon 413, a phone number list stored in the image forming apparatus 100 may be displayed on the screen 401. When the user selects the icon 411, email addresses stored in the image forming apparatus 100 may be displayed on the screen 401. The user selects at least one of the email addresses displayed on the screen 401, thereby transmitting content to a desired receiver. Alternatively, the user may directly input an address of the desired receiver to the first area 405, thereby transmitting the content to the desired address.

An icon 407 may be displayed on the first area 405 or on the periphery of the first area 405. When the user selects the icon 407, the image forming apparatus 100 may receive a receiver address from the mobile device 20 or 30 in a sharing manner When the icon 407 is displayed on the first area 405 or on the periphery of the first area 405 in which receiver information is displayed, even if there is no separate description about the icon 407, the user may intuitively recognize that the user can input a receiver address by using an address stored in a mobile device by selecting the icon 407.

When the user selects the icon 407, the image forming apparatus 100 may generate a code of the identification information of the image forming apparatus 100, the application information about an application being executed in the image forming apparatus 100, and/or information about the category 409, 411, or 413 of a receiver address. The identification information may refer to information for identifying the image forming apparatus 100 in a network and may include an IP address and a MAC address of the image forming apparatus 100. The application information may include information about an identifier (ID) of the application, a name of the application, and/or executed time. The code may be generated as NFC tag information, a QR code, or a barcode. For convenience of description, in the specification, the code is assumed to be the QR code, but a same processing method may be applied to an NFC tag or the barcode.

When the user selects the icon 407 displayed on the periphery of the first area 405, the image forming apparatus 100 may generate the code including the identification information of the image forming apparatus 100, the application information, and/or a category of the receiver information, and may generate the QR code from the code. The QR code is image information.

That is, the controller 310 may generate an image including the identification information, the application information, and/or the category of the receiver information, in response to a user input of selecting the icon 407 displayed on the periphery of the first area 405, and may display the image on the screen 401. When the user captures an image of the QR code displayed on the screen 401, by using a camera included in the mobile device, the camera of the mobile device generates an image file by capturing the image of the QR code, and transmits the image file to the controller 310. The controller 310 of the mobile device may extract, from the image file, the identification information of the image forming apparatus 100, the application information, and/or the category of the receiver information. According to another embodiment, the QR code may include information about the image forming apparatus 100. The information about the image forming apparatus 100 may include a name of the image forming apparatus 100 to which the user has applied.

When the mobile device 30 receives a QR code 421 through the camera unit 350, the mobile device 30 may display the address book stored in the memory 330 on the screen of the display 360, based on receiver category information included in the QR code 421. That is, the controller 310 may display the address book stored in the memory 330 on the screen of the display 360, based on the QR code 421 received through the camera unit 350.

In addition, the mobile device 30 may filter the address book by using the receiver category information included in the QR code 421. In more detail, the controller 310 may filter the address book, based on a category included in the QR code 421, and may display a filtering result on the screen of the display 360. For example, when the user selects the icon 411 on the image forming apparatus 100 and then selects the icon 407, the image forming apparatus 100 may generate and display the QR code 421 on the screen 401.

When the user captures an image of the QR code 421 by using the mobile device 30, email addresses that are filtered from the address book stored in the mobile device 30 may be displayed on the screen of the display 360 of the mobile device 30. When the user selects at least one email address from among the email addresses displayed on the screen of the display 360, the selected email address may be transmitted to the image forming apparatus 100. The mobile device 30 may transmit the email address stored in the mobile device 30 to the image forming apparatus 100 by using the identification information of the image forming apparatus 100 included in the QR code 421. In more detail, the controller 310 of the mobile device 30 may determine the image forming apparatus 100 to receive the email address, by using the IP address, the MAC address, and/or the application information of the image forming apparatus 100 which are included in the QR code 421. For example, the mobile device 30 may transmit the email address to the image forming apparatus 100, according to the HTTP communication format.

When the image forming apparatus 100 receives an email address 441 from the mobile device 30, the image forming apparatus 100 may display the received email address 441 on the first area 405 of the screen 401.

FIG. 5 illustrates an example of a QR code data format generated by the image forming apparatus 100 (e.g., the electronic device 10), according to an embodiment of the present disclosure.

Referring to FIG. 5, a QR code 500 may include application information 501 and device information 511. The application information 501 may be information about an application that is being executed in the image forming apparatus 100. The application information 501 may include an application name 503, a supported-job type 505, a requested-job type 507, and whether or not a multiple job 509 is performed. When the user selects multiple jobs in the image forming apparatus 100, the multiple-job 509 is set to be 'true', and when the user does not select the multiple jobs, the multiple job 509 is set to be 'false'.

In this regard, a job type may be information indicating a category of a receiver address. For example, category information may be an email address, a fax number, a phone number, or a mailing address, and may be a parameter for filtering the address book stored in the mobile device 30.

The device information 511 may include an IP address 513, a MAC address 515, a host name 517 of a device, location information 519 about a location in which the device is installed, a serial number 521 of the device, and a model name 523 of the device. In this regard, the device may indicate the image forming apparatus 100.

That is, in response to a user input of selecting the icon 407 displayed on the first area 405 or on the periphery of the first area 405, the image forming apparatus 100 may generate a code including the application name 503, the supported-job type 505, the requested-job type 507, the IP address 513, the MAC address 515, the host name 517 of the image forming apparatus 100, the location information 519 about the location in which the image forming apparatus 100 is installed, the serial number 521 of the image forming apparatus 100, and the model name 523 of the image forming apparatus 100. The code may be generated in one of various forms. For example, the code may be generated as a QR code, a barcode, or NFC tag information. The QR code and the barcode may be images. That is, the image forming apparatus 100 may generate an image including the application name 503, the supported-job type 505, the requested-job type 507, the IP address 513 of the image forming apparatus 100, the MAC address 515, the host name 517, the location information 519, the serial number 521, and the model name 523. As described above, the code may be generated in one of various forms, and may be input to the mobile device 30 by using an input device appropriate for the generated form. For example, when the code is generated as the QR code or the barcode, the mobile device 30 may input the code to the mobile device 30 by using a camera unit 350 included in the mobile device 30. When the code is generated as an NFC tag, the code may be input to the mobile device 30 by using the NFC module included in the mobile device 30. Hereinafter, it is assumed that the code is generated as the QR code, but the present disclosure is not limited thereto.

FIG. 6 illustrates an example of a data file 600 to be transmitted from a mobile device to the image forming apparatus 100, according to an embodiment of the present disclosure.

Referring to FIG. 6, the data file 600 may be defined to have an HTTP format. The HTTP refers to a communication protocol used to transmit a document between a web server and an internet browser of a user over the Internet.

The data file 600 may include an IP address 601 of the image forming apparatus 100 and an address selected from the mobile device by a user. For example, the data file 600 may include an email address 603, a fax number 605, and a phone number 607 for an account in a cloud printing server, which are included in an address book stored in the mobile device. The phone number 607 for an account in a cloud printing server may be used as an identifier for identifying the cloud printing server.

The mobile device generates the data file 600 by using the IP address 601 of the image forming apparatus 100 included in a QR code, a barcode, or NFC tag information, and the address selected from the mobile device by the user. The mobile device may filter the address book of the mobile device by using receiver category information included in the QR code, the barcode, or the NFC tag information.

An example in which the mobile device filters the address book by using the receiver category information included in the QR code will be described in detail with reference to FIGS. 7 to 17.

Figure 7:
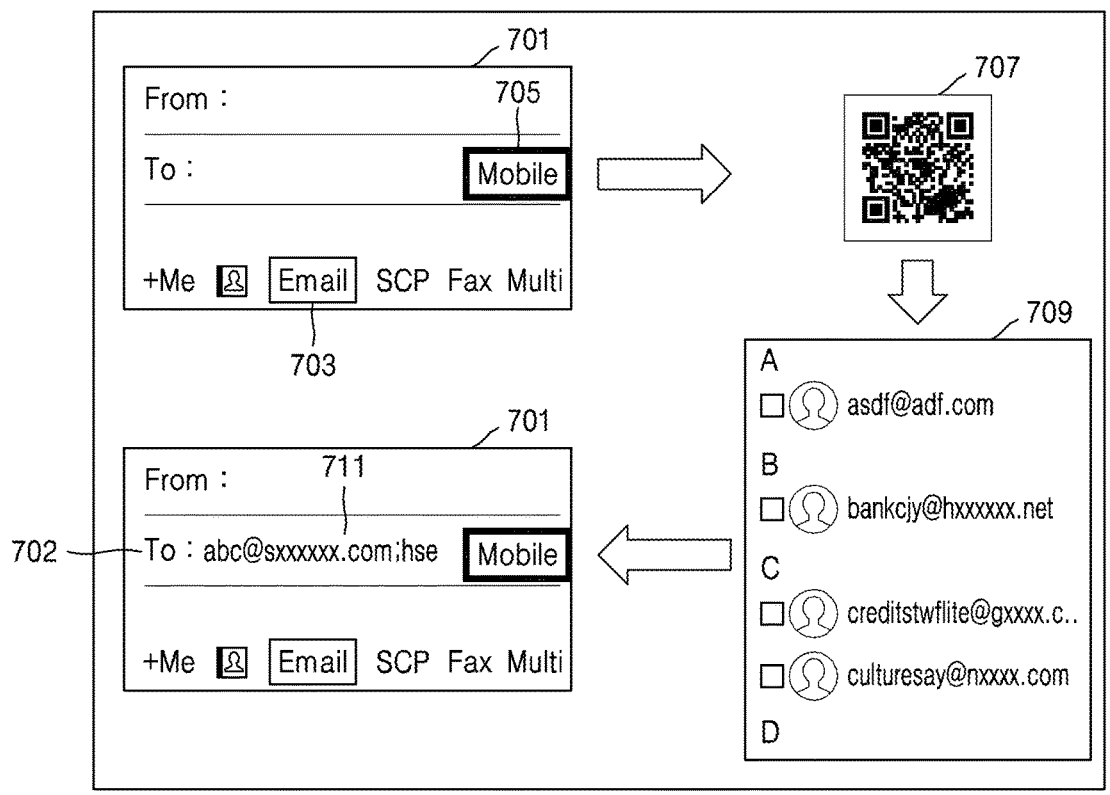

FIGS. 7 to 9 illustrate a code generated by the image forming apparatus 100, a screen displayed on a mobile device, and a data file transmitted from the mobile device, when a user selects a receiver category to be an email address according to an embodiment of the present disclosure.

Referring to FIG. 7, a screen 701 is displayed on a display of the image forming apparatus 100. Elements of the screen 701 are the same as those described with reference to FIG. 4, thus, descriptions about the elements are omitted here. When the user selects an email icon 703 on the screen 701 and then selects a mobile icon 705, the image forming apparatus 100 may generate a code 707 including category information corresponding to the email icon 703. For example, when the email icon 703 is selected, the category information may be 'Email'. The code 707 may be a QR code, a barcode, or NFC tag information. Hereinafter, for convenience of description, it is assumed that the code 707 is the QR code, the same rule may be applied even when the code 707 is the barcode or the NFC tag information.

Referring to FIG. 8, a QR code 800 may include an application name 801, receiver categories 803, 805, and 807 provided by the image forming apparatus 100, 'Email' 809 that is the category information corresponding to the email icon 703 selected by the user, and device information 812. The device information 812 may include an IP address 811, a MAC address 813, a host name 815, device location information 816, a serial number 817, and a model name 819.

The image forming apparatus 100 may display the generated QR code 707 on the screen 701. When the user captures an image of the QR code 707 by using a camera included in the mobile device, the mobile device extracts application information 802 and the device information 812 included in the QR code 800. The mobile device may filter addresses corresponding to emails in an address book stored in the mobile device by using 'Email' that is receiver category information included in the application information 802, and may display the email addresses on a screen 709 of the mobile device. When the user selects at least one email address on the screen 709, the mobile device may generate a data file based on a user input of selecting the email address (e.g., email address 711), and may transmit the data file to the image forming apparatus 100.

Referring to FIG. 9, a HTTP data file 900 generated by the mobile device is illustrated. The HTTP data file 900 may include an IP address 901 of the image forming apparatus 100, an application name 902 that is being executed in the image forming apparatus 100, and an email address 905 that is selected by the user. When the user selects a plurality of email addresses, each of the email addresses may be distinguished by a delimiter (e.g., '%').

The HTTP data file 900 is transmitted to an address indicated by the IP address 901 (e.g., 10.220.202.251), and the email address 905 included in the HTTP data file 900 may be displayed on a first area 702 of the screen 701 of the image forming apparatus 100. For example, the IP address 901 of the image forming apparatus 100 may be 10.220.202.251, and the mobile device may determine the image forming apparatus 100 to receive a data file by referring to the IP address 901 and the application name 902 included in the HTTP data file 900, and may transmit the data file to the image forming apparatus 100. The image forming apparatus 100 may deliver the email address 905 to an application by referring to the application name 902 included in the received HTTP data file 900. The image forming apparatus 100 may display, on the first area 702 of the screen 701, the email address 905 that is delivered to the application.

Figure 10:
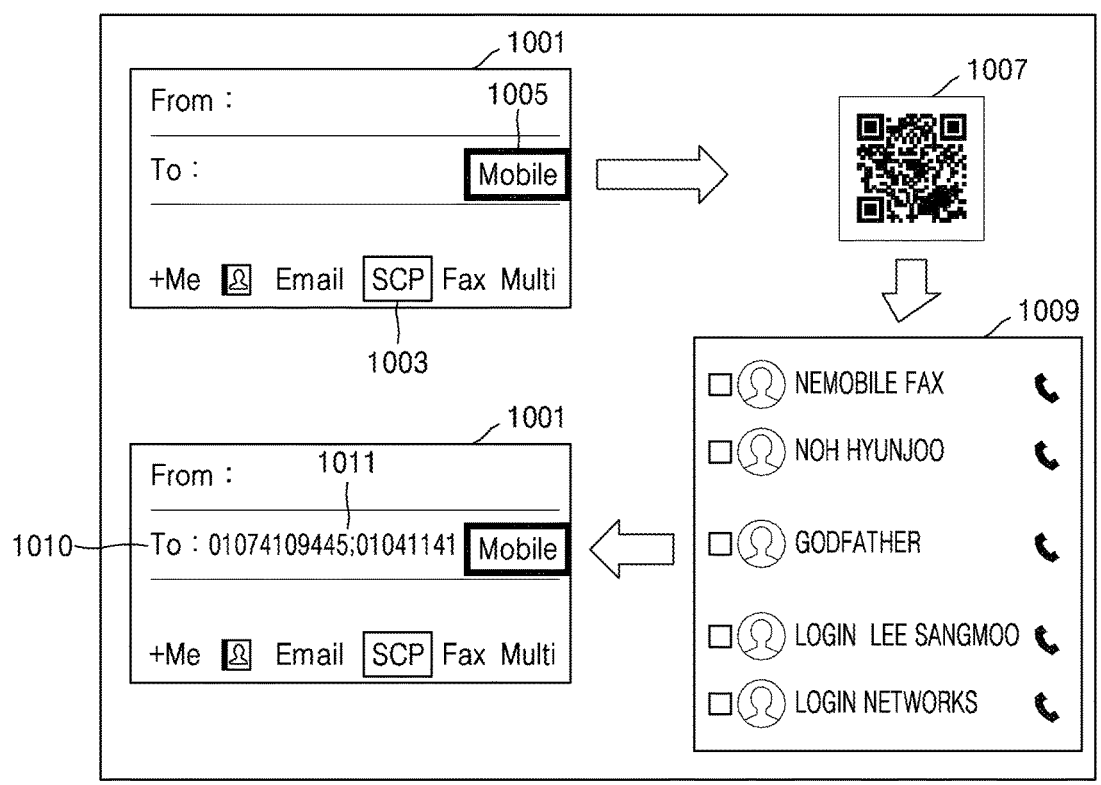

FIGS. 10 to 12 illustrate a code generated by the image forming apparatus 100, a screen 1009 displayed on the mobile device 30, and a data file transmitted from the mobile device 30, when a user selects a receiver category to be SCP according to an embodiment of the present disclosure.

The SCP may refer to performing a printing job by using a cloud server, and the printing job may be performed by using a phone number. The SCP is an example and an icon name may be changed.

Detailed processes are equal to those described with reference to FIGS. 7 through 9, thus, detailed descriptions thereof are omitted here.

Referring to FIG. 10, when the user selects a SCP icon 1003 and then selects an icon 1005 on a screen 1001, a QR code 1007 may be generated.

Referring to FIG. 11, the QR code 1100 (e.g., the QR code 1007 of FIG. 10) may include a SCP 1109 as a job type. Descriptions about a plurality of items of data included in the QR code 1007 are equal to those described with reference to FIG. 8, thus, detailed descriptions thereof are omitted here.

When the user captures an image of the QR code 1007 displayed on a screen, by using the mobile device 30, an address book stored in the mobile device 30 may be filtered with respect to phone numbers and may be displayed on the screen 1009 of the mobile device 30.

When the user selects at least one phone number on the screen 1009, an HTTP data file (e.g., HTTP data file 1011) including the selected phone number is generated.

Referring to FIG. 12, a HTTP data file 1200 may include a user-selected phone number 1205. The mobile device 30 may transmit the HTTP data file 1200 to the image forming apparatus 100 by referring to an IP address 1201 and an application name 1202 included in the HTTP data file 1200. The image forming apparatus 100 may deliver the phone number 1205 to an application by referring to the application name 1202 included in the received HTTP data file 1200. The image forming apparatus 100 may display, on a first area 1010 of a screen 1001, the phone number 1205 that is delivered to the application.

Figure 13:
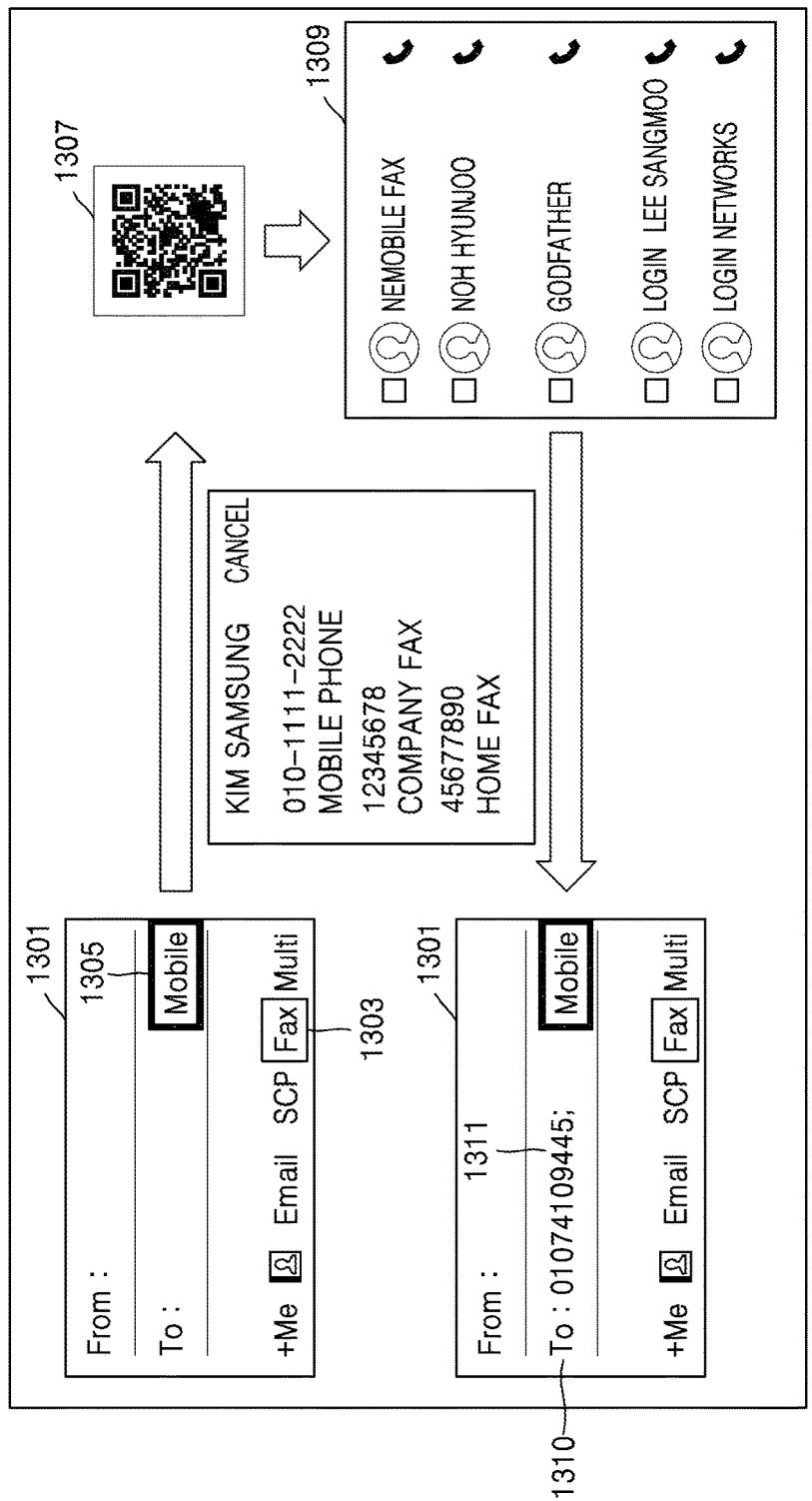

FIGS. 13 and 14 illustrate a code generated by the image forming apparatus 100 and a screen 1309 displayed on the mobile device 30, when a user selects a receiver category to be a fax according to an embodiment of the present disclosure. Detailed processes are equal to those described with reference to FIGS. 7 to 9, thus, detailed descriptions thereof are omitted here. When the user selects a FAX icon 1303 on the image forming apparatus 100, the image forming apparatus 100 may transmit content (e.g., print data) to the other party by using a fax number.

Referring to FIG. 13, when the user selects the FAX icon 1303 and then selects an icon 1305 on a screen 1301, a QR code 1307 may be generated.

Referring to FIG. 14, the QR code 1400 (e.g., the QR code 1307 of FIG. 13) may include a Fax 1409 as a job type. When the user captures an image of the QR code 1307 displayed on a display of the image forming apparatus 100 by using a camera included in the mobile device 30, an address book stored in the mobile device 30 may be filtered with respect to fax numbers and then may be displayed on the screen 1309 of the mobile device 30.

When the user selects at least one fax number on the screen 1309, a HTTP data file including the selected fax number is generated.

The mobile device 30 may transmit the HTTP data file to the image forming apparatus 100 by referring to an IP address 1411 and an application name 1401 included in the HTTP data file. The image forming apparatus 100 may deliver the fax number to an application by referring to the application name 1401 included in the received HTTP data file, and may display a fax number 1311 on a first area 1310 of the screen 1301.

Figure 15:
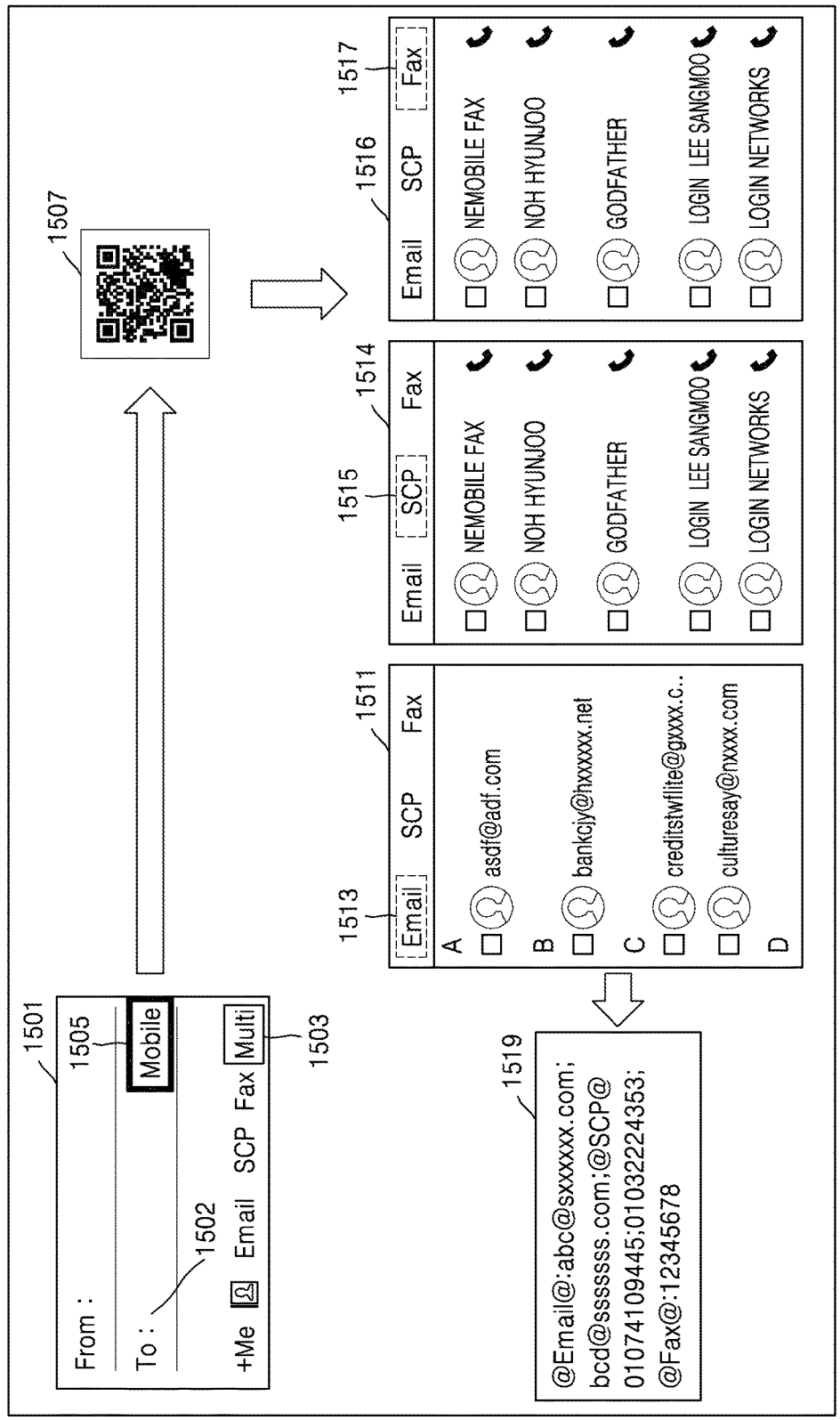
Figure 17:
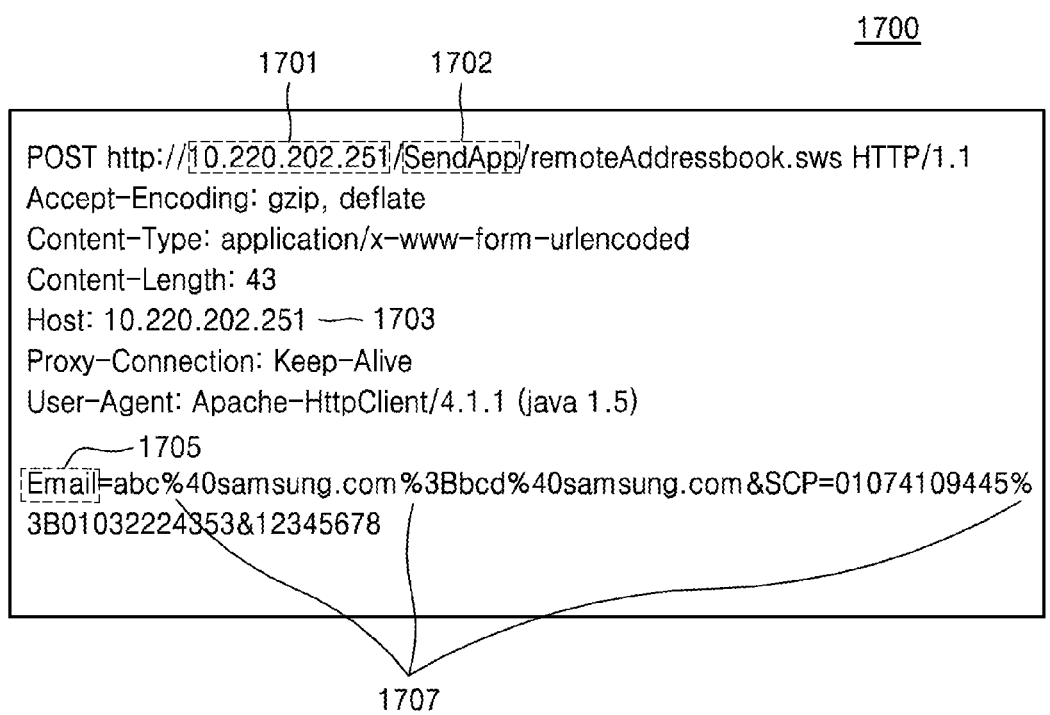

FIGS. 15 to 17 illustrate a code generated by the image forming apparatus 100, a screen 1511, 1514, 1516 displayed on the mobile device 30, and a data file transmitted from the mobile device 30, when a user selects a receiver category to be Multi according to an embodiment of the present disclosure.

The Multi refers to selecting a plurality of receiver categories.

Detailed processes are equal to those described with reference to FIGS. 7 through 9, thus, detailed descriptions thereof are omitted here.

Referring to FIG. 15, when the user selects a Multi icon 1503 and then selects an icon 1505 on a screen 1501, a QR code 1507 is generated.

Referring to FIG. 16, a QR code 1600 includes information 1609 indicating that a job type corresponds to Multi. When the user captures an image of the QR code 1507 displayed on a screen of the image forming apparatus 100, by using a camera included in the mobile device 30, category tabs 1513, 1515, and 1517 that are Email 1513, SCP 1515, and Fax 1517 may be displayed on the screen 1511 of the mobile device 30.

When the user selects the Email 1513 on the screen 1511, a list of email addresses is displayed on the screen 1511. When the user selects the SCP 1515 on the screen 1511, a list of phone numbers corresponding to SCP is displayed. When the user selects the Fax 1517 on the screen 1511, a list of fax numbers is displayed. When the user selects at least one of the list of email addresses, the list of phone numbers, and the list of fax numbers, a HTTP data file including a selected fax number is generated.

Referring to FIG. 17, a HTTP data file 1700 may include a user-selected item 1705 and a host address 1703. When the user-selected item 1705 is plural in number, each of the plurality of items may be distinguished by a delimiter 1707 (e.g., '%'.

The mobile device 30 may transmit the HTTP data file 1700 to the image forming apparatus 100 by referring to an IP address 1701 and an application name 1702 included in the HTTP data file 1700. The image forming apparatus 100 may deliver the user-selected item 1705 to an application by referring to the application name 1702 included in the received HTTP data file 1700, and may display an address 1519 on a first area 1502 of the screen 1501.

When the plurality of items are selected, a delimiter (e.g., '%') may be displayed between every two of the items. For example, an email, a phone number, and a fax number may be distinguished therebetween by using a delimiter '%'.

Figure 18:
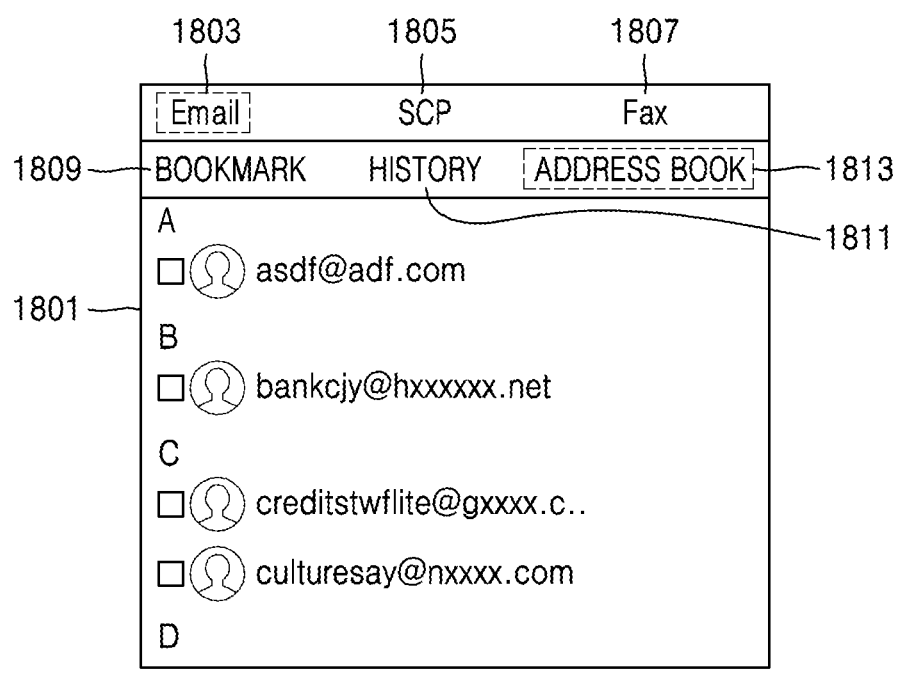
FIG. 18 illustrates an example in which an address book that was previously transmitted, and an address book that is appointed as a bookmark are displayed on a screen of a mobile device, and the mobile device receives an input of selection from a user according to an embodiment of the present disclosure.

FIG. 18 illustrates an example in which an address book that was previously transmitted, and an address book that is appointed as a bookmark are displayed on a screen of a mobile device, and the mobile device receives an input of selection from a user according to an embodiment of the present disclosure.

Referring to FIG. 18, an Email tab 1803, a SCP tab 1805, and a Fax tab 1807 may be displayed on a screen 1801 of the mobile device. A bookmark 1809, a history 1811, and an address book 1813 may be displayed below the tabs. When the user selects a category to be 'Multi' in the image forming apparatus 100, tabs corresponding to all categories may be displayed on the screen 1801 of the mobile device. When the user selects the Email tab 1803 and selects the bookmark 1809, email addresses that are frequently used by the user may be displayed on the screen 1801. When the user selects the Email tab 1803 and selects the history 1811, email addresses that were used by the user in previous transmission may be displayed on the screen 1801. When the user selects the Email tab 1803 and selects the address book 1813, all addresses included in an address book may be displayed on the screen 1801. When the user selects at least one address from the address book displayed on the screen 1801, the selected address may be displayed on a first area of a screen of the image forming apparatus 100.

Figure 19:
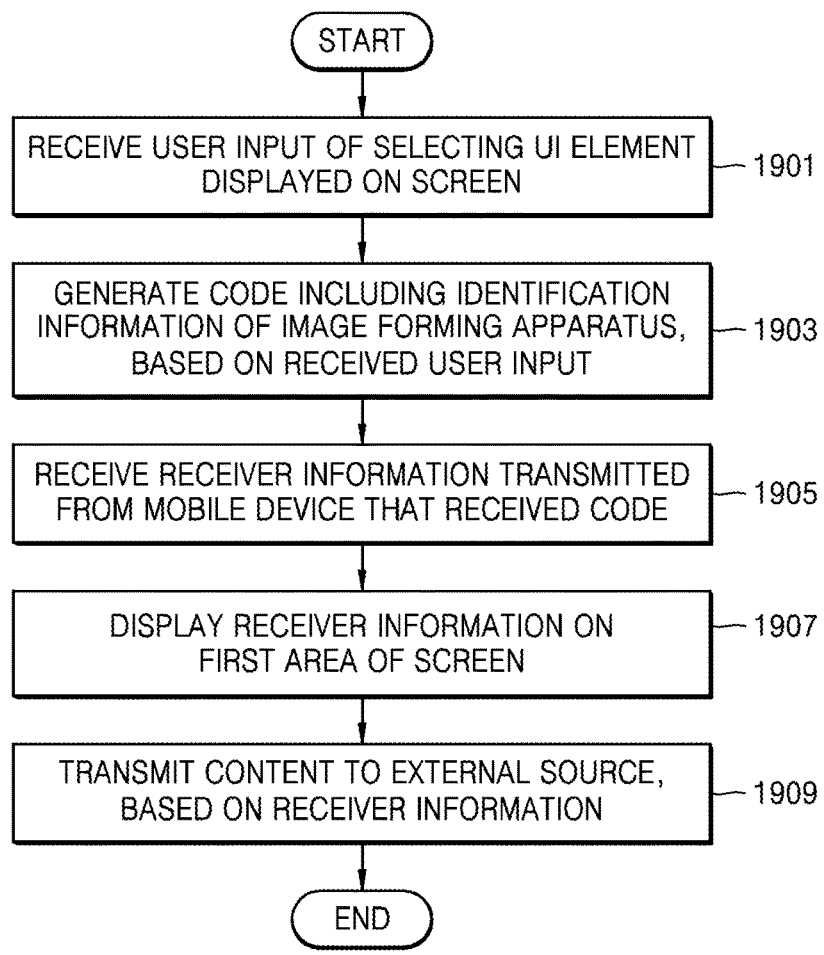
FIG. 19 illustrates a flowchart of processes of receiving, by the image forming apparatus, an address from a mobile device according to an embodiment of the present disclosure.

FIG. 19 illustrates a flowchart of receiving an address from a mobile device and processing the address, the processes being performed by the image forming apparatus 100 according to an embodiment of the present disclosure.

Referring to FIG. 19, in operation 1901, the image forming apparatus 100 receives a user input of selecting a UI element displayed on a screen. The UI element may be an icon or a virtual button displayed on the screen. The UI element may be displayed on a first area or on the periphery of the first area of the screen so as to allow a user to input receiver information. The first area may be an area in which the receiver information is to be displayed.

For example, when the user touches an icon displayed on a touchscreen, the controller 310 of the image forming apparatus 100 may receive a user input via the icon. The icon may correspond to a user command of requesting the image forming apparatus 100 to receive receiver information from the mobile device.

In operation 1903, the image forming apparatus 100 generates a code including identification information of the image forming apparatus 100, based on the user input of selecting the UI element displayed on the screen. The identification information may be communication setting information and may be unique information for identifying the image forming apparatus 100 in a network. For example, the identification information may be an IP address or a MAC address of the image forming apparatus 100. The code may be generated as a QR code, a barcode, or NFC tag information, but the present disclosure is not limited thereto.

In operation 1905, the image forming apparatus 100 may receive the receiver information transmitted from the mobile device that received the code. For example, when the image forming apparatus 100 generates a QR code including an IP address and a MAC address of the image forming apparatus 100, and the mobile device captures an image of the QR code by using a camera, the QR code may be input to the mobile device. The mobile device may refer to the IP address of the image forming apparatus 100 included in the QR code and may transmit, to the image forming apparatus 100, an address selected by the user through the mobile device. In operation 1905, the image forming apparatus 100 receives the receiver information transmitted from the mobile device that received the QR code. In operation 1907, the image forming apparatus 100 displays the receiver information transmitted from the mobile device on the first area of the screen, and in operation 1909, the image forming apparatus 100 transmits content to an external source, based on the receiver information.

Figure 20:
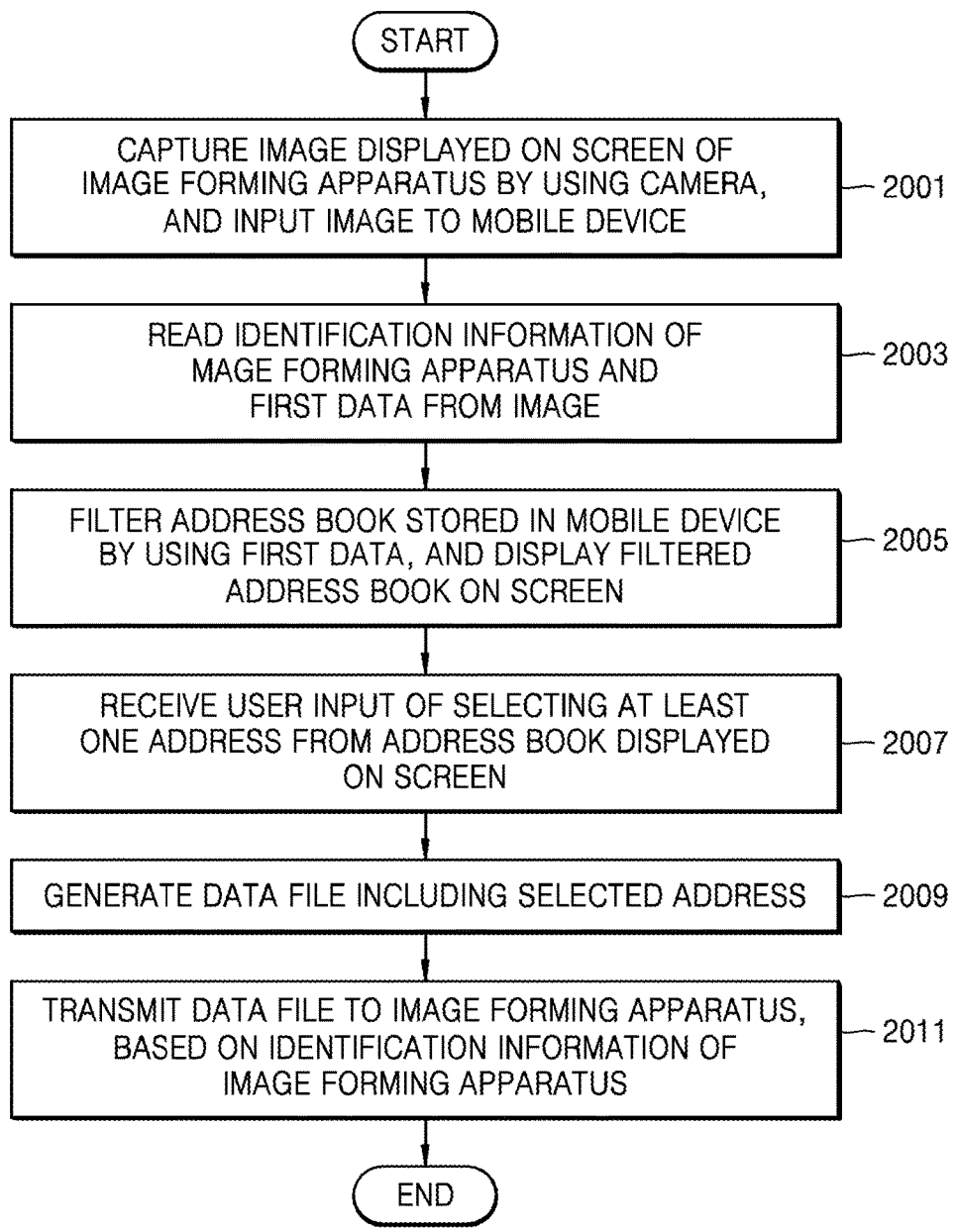
FIG. 20 illustrates a flowchart of processes of processing a code generated by the image forming apparatus, the processes being performed by a mobile device according to an embodiment of the present disclosure.

FIG. 20 illustrates a flowchart of processes of processing a code generated by the image forming apparatus 100, the processes being performed by a mobile device according to an embodiment of the present disclosure.

Referring to FIG. 20, in operation 2001, the mobile device captures an image of a QR code displayed on a screen of the image forming apparatus 100, by using a camera included in the mobile device, and inputs the image of the QR code to the mobile device. In operation 2003, the mobile device reads identification information of the image forming apparatus 100 and first data from the input QR code. The identification information is equal to that described with reference to FIG. 19, and thus, detailed descriptions thereof are omitted herein. The first data indicates a category of receiver information.

In operation 2005, the mobile device filters an address book stored in a memory of the mobile device, by using the first data, and displays the filtered address book on the screen. For example, when the first data indicates an email, the mobile device filters email addresses from the address book stored in the memory and displays the email addresses on a screen.

In operation 2007, the mobile device receives a user input of selecting at least one address from the address book displayed on the screen. When the user input with respect to the address book displayed on the screen is received, in operation 2009, the mobile device generates a data file including the selected address based on the user input. The data file may be data having a HTTP format. The mobile device generates the HTTP data file based on the user-selected address, and the identification information of the image forming apparatus 100 and the first data which are extracted from the QR code, and in operation 2011, the mobile device transmits the generated HTTP data file to the image forming apparatus 100, based on the identification information of the image forming apparatus 100.

According to the embodiments, in order to transmit content generated by or stored in the electronic apparatus, receiver information may be easily input by using the address book stored in the mobile device, so that the content may be conveniently transmitted to a user-designated receiver. In particular, an address of the mobile device may be used in the electronic apparatus, without separate communication setting between the electronic apparatus and an external device (e.g., the mobile device) that provides the receiver information.

The embodiments can be embodied as a non-transitory computer-readable recording medium storing an instruction and data that are executable by a computer. At least one of the instruction and the data may be stored as a program code that may perform a pre-set operation by generating a pre-set program module when executed by a controller.

The non-transitory computer-readable recording medium may include magnetic storage media such as hard disks, optical recording media such as CD-ROMs, digital versatile discs (DVDs), etc., non-volatile semiconductor memories, and memories included in server that are accessible through a network. In addition, the non-transitory computer-readable recording medium may include a random-access memory (RAM) included in a controller or a processor.

For example, the non-transitory computer-readable recording medium may be at least one of the memory 140 of the image forming apparatus 100 and the memory 114 of the I/O unit 110, or may be a memory included in an external device (not shown) connected to the image forming apparatus 100 via a network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a transceiver;
a display;
a memory; and
at least one processor to:
receive a user input for selecting a user interface (UI) element displayed on a screen of the display,
generate a code, comprising identification information of the electronic apparatus, based on the user input of selecting the UI element,
receive receiver information transmitted from an external device that received the code,
control the display to display the receiver information on a first area of the screen of the display, and
control the transceiver to transmit content to an external source based on the receiver information.

2. The electronic apparatus of claim 1, wherein the at least one processor generates the code based on a user input of selecting a category of the receiver information.

3. The electronic apparatus of claim 2, wherein the code comprises data for filtering one or more addresses stored in the external device.

4. The electronic apparatus of claim 1, wherein the at least one processor is further configured to:
generate the code as an image; and
control the display to display the image on the display.

5. The electronic apparatus of claim 4, wherein the code comprises a quick response (QR) code.

6. The electronic apparatus of claim 1, wherein the code comprises near-field communication (NFC) tag information.

7. The electronic apparatus of claim 1, wherein the at least one processor controls the display to display the UI element on a periphery of the receiver information displayed on the display.

8. The electronic apparatus of claim 1, wherein the identification information of the electronic apparatus comprises at least one of an internet protocol (IP) address or a media access control (MAC) address.

9. The electronic apparatus of claim 1, further comprising:
a scanner,
wherein the content is generated by using the scanner.

10. The electronic apparatus of claim 1, wherein the receiver information comprises at least one of an email address or a phone number of the external device.

11. A method of transmitting content by an electronic apparatus, the method comprising:
receiving a user input for selecting a user interface (UI) element displayed on a screen;
generating a code, comprising identification information of the electronic apparatus, based on the user input;
receiving receiver information transmitted from an external device that received the code;
displaying the receiver information on a first area of the screen; and
transmitting content to an external source based on the receiver information.

12. The method of claim 11, wherein the UI element is displayed on a periphery of the first area of the screen.

13. The method of claim 11, further comprising:
receiving a user input for selecting a category of the receiver information; and
generating the code based on the user input.

14. The method of claim 13, wherein the code comprises data for filtering one or more addresses stored in the external device.

15. The method of claim 11, further comprising:
generating the code as an image; and
displaying the image on the screen.

16. The method of claim 15, wherein the code comprises a quick response (QR) code.

17. The method of claim 11, wherein the code comprises near-field communication (NFC) tag information.

18. The method of claim 11, wherein the identification information of the electronic apparatus comprises at least one of an internet protocol (IP) address or a media access control (MAC) address.

19. The method of claim 11, further comprising:
transmitting the code to the external device.

20. The method of claim 11, wherein the receiver information comprises at least one of an email address or a phone number of the external device.

* * * * *

UNITED STATES PATENT AND TRADEMARK OFFICE
CERTIFICATE OF CORRECTION

PATENT NO. : 10,250,774 B2  
APPLICATION NO. : 15/625240  
DATED : April 2, 2019  
INVENTOR(S) : Hyung-seon Song et al.

Page 1 of 1

It is certified that error appears in the above-identified patent and that said Letters Patent is hereby corrected as shown below:

In the Drawings

Drawing sheet 21 of 21, FIG. 20, reference numeral 2003, Line 2, delete "MAGE" and insert -- IMAGE --, therefor.

Signed and Sealed this  
Tenth Day of September, 2019

Andrei Iancu  
*Director of the United States Patent and Trademark Office*